United States Patent
Hogan

(10) Patent No.: US 10,614,280 B2
(45) Date of Patent: *Apr. 7, 2020

(54) SYSTEM AND METHOD FOR FINGERPRINT VALIDATION

(71) Applicant: Joshua Noel Hogan, Los Altos, CA (US)

(72) Inventor: Joshua Noel Hogan, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,550

(22) Filed: Dec. 11, 2018

(65) Prior Publication Data

US 2019/0108380 A1 Apr. 11, 2019

Related U.S. Application Data

(62) Division of application No. 15/633,439, filed on Jun. 26, 2017, now Pat. No. 10,192,095, which is a division of application No. 14/738,919, filed on Jun. 14, 2015, now Pat. No. 9,721,138.

(60) Provisional application No. 62/013,130, filed on Jun. 17, 2014.

(51) Int. Cl.
*G01B 9/02* (2006.01)
*G06K 9/00* (2006.01)

(52) U.S. Cl.
CPC ....... *G06K 9/0002* (2013.01); *G06K 9/00033* (2013.01); *G06K 9/00885* (2013.01); *G06K 9/00892* (2013.01); *G06K 2009/00932* (2013.01)

(58) Field of Classification Search
CPC ............ G06K 9/0002; G06K 9/00033; G06K 9/00026; G06K 9/00107; G06K 9/00114; G06K 9/0012; G06K 9/00885; G06K 9/00892; G06K 9/00899; G06K 9/00906; G06K 2009/00932; G06K 2009/00939; G01B 9/02091
USPC .................................................. 356/479, 497
See application file for complete search history.

(56) References Cited

U.S. PATENT DOCUMENTS

| | | | |
|---|---|---|---|
| 7,248,907 B2 | 7/2007 | Hogan |
| 7,526,329 B2 | 4/2009 | Hogan |
| 7,751,862 B2 | 7/2010 | Hogan |
| 7,795,062 B2 | 9/2010 | Taussig et al. |
| 8,870,376 B2 | 10/2014 | Hogan |
| 8,888,284 B2 | 11/2014 | Hogan |

OTHER PUBLICATIONS

Chang et al (Optical Coherence Tomography used for security and fingerprint-sensing applications, IET Image Process., 2008, vol. 2, No. 1, pp. 48-58 doi: 10.1049/iet-ipr: 20070021) (Year: 2008).*

(Continued)

*Primary Examiner* — Tarifur R Chowdhury
*Assistant Examiner* — Jonathan Cook

(57) ABSTRACT

The invention provides a system and method for rapid validation of identity from tissue using registered two dimensional and optical coherence tomography (OCT) scan images. The preferred embodiment provides, for a human fingerprint, validation that the surface fingerprint matches the primary fingerprint. An alternate embodiment provides validation of "aliveness" by ascertaining blood flow. Various embodiments are taught.

1 Claim, 7 Drawing Sheets

(56) References Cited

OTHER PUBLICATIONS

Bossen et al Internal Fingerprint Identification With Optical Coherence Tomography, IEEE Photonics Technology Letters, vol. 22, No. 7, Apr. 1, 2010 (Year: 2010).*
Dubey et al Simultaneous topography and tomography of latent fingerprints using full-field swept-source optical coherence, 2008 J. Opt. A: Pure Appl. Opt. 10 015307tomography (Year: 2008).*
Sousedik et al Volumetric Fingerprint Data Analysis using Optical Coherence Tomography, IEEE, 2013 International Conference of the BIOSIG Special Interest Group (BIOSIG), 978-3-88579-606-0 (Year: 2013).*
Cheng et al Artificial fingerprint recognition by using optical coherence tomography with autocorrelation analysis, Applied Optics vol. 45, No. 36 Dec. 20, 2006 (Year: 2006).*
Chang et al Optical coherence tomography: technology and applications, technology and applications, Proc. SPIE 7156, 2008 International Conference on Optical Instruments and Technology: Optical Systems and Optoelectronic Instruments, 715606 (Jan. 26, 2009); doi: 10.1117/12.806813 (Year: 2009).*
Dubey et al Fingerprint detection using full-field sweptsource optical coherence tomography, Appl. Phys. Lett. 91, 181106 (2007); https://doi.org/10.1063/1.2800823 (Year: 2007).*
U.S. Appl. No. 13/261,848, Oct. 23, 2014, Hogan.
U.S. Appl. No. 14/435,701, Hogan.

* cited by examiner

SYSTEM AND METHOD FOR FINGERPRINT VALIDATION

CROSS REFERENCES TO RELATED PATENTS OR APPLICATIONS

This application claims priority from U.S. provisional application 62/013,130. It also relates to U.S. Pat. No. 7,248,907 filed on Oct. 19, 2005 titled "Correlation of Concurrent Non-invasively Acquired Signals", the contents of which is incorporated by reference as if fully set forth herein. It is also related to Pub No US-2014-0313515-A1, U.S. application Ser. No. 13/261,848, titled "Improved Correlation of Concurrent Non-invasively Acquired Signals" and to U.S. application Ser. No. 14/435,701 "Enhanced OCT Measurement and Imaging Apparatus and Method".

It is also related to U.S. Pat. No. 8,870,376 entitled Non Invasive Optical Monitoring and U.S. Pat. No. 8,888,284 entitled A Filed of Light Based Device, the contents of which is incorporated by reference as if fully set forth herein. This invention is also related to U.S. Pat. No. 7,526,329 titled Multiple reference non-invasive analysis system and U.S. Pat. No. 7,751,862 titled Frequency resolved imaging system, the contents of both of which are incorporated by reference herein as if fully set forth.

GOVERNMENT FUNDING

None

FIELD OF USE

The invention relates to non-invasive imaging and analysis techniques such as Optical Coherence Tomography (OCT). In particular it relates using optical interferometric techniques to monitor or measure sub-surface attributes of human tissue in conjunction with surface imaging techniques. Correlation of surface images and sub-surface images is useful in secure identification, verification of life, authentication of identity, and other bio-metric applications.

BACKGROUND OF THE INVENTION

Non-invasive imaging and analysis of targets is a valuable technique for acquiring information about systems or targets without undesirable side effects, such as damaging the target or system being analyzed. In the case of analyzing living entities, such as human tissue, undesirable side effects of invasive analysis include the risk of infection along with pain and discomfort associated with the invasive process. In the case of quality control, it enables non-destructive imaging and analysis on a routine basis.

Optical coherence tomography (OCT) is a technology for non-invasive imaging and analysis. There are more than one OCT techniques. Time Domain OCT (TD-OCT) typically uses a broadband optical source with a short coherence length, such as a super-luminescent diode (SLD), to probe and analyze or image a target. Multiple Reference OCT (MRO) is a version of TD-OCT that uses multiple reference signals. Another OCT technique is Fourier Domain OCT (FD-OCT).

A version of Fourier Domain OCT, called Swept Source OCT (SS-OCT), typically uses a narrow band laser optical source whose frequency (or wavelength) is swept (or varied) over a broad wavelength range. In TD-OCT systems the bandwidth of the broadband optical source determines the depth resolution. In SS-OCT systems the wavelength range over which the optical source is swept determines the depth resolution.

Another version of Fourier Domain OCT, often referred to as Spectral Domain OCT (SD-OCT), typically uses a broad band optical source and a spectrometer to separate out wavelengths and detect signals at different wavelengths by means of a multi-segment detector.

OCT depth scans can provide useful sub-surface information including, but not limited to: sub-surface images of regions of tissue; measurement of thickness of layers of tissue; magnitude of regions of abnormal tissue growth; measurement of concentration of metabolites, such as glucose, in tissue fluids; measurement of concentration of metabolites, such as glucose, in blood. More generally OCT depth scans can provide useful sub-surface information regarding attributes of tissue.

It is often useful to acquire OCT sub-surface scans of tissue at known locations with respect to the tissue surface. While OCT can produce two dimensional images of the surface of a target such as tissue, there are conventional imaging technologies that can capture surface images, such as a camera employing a conventional charged coupled device (CCD). Such conventional imaging devices can readily capture images of the surface of tissue.

Tissue can be imaged to acquire a surface fingerprint by various techniques including, but not limited to: cameras using one or more conventional charged coupled device (CCD); an array of conducting sensors in conjunction with an RF generator (as in an iPhone fingerprint detector); ultrasonic imaging systems, such as those using capacitive micro-machined ultrasound transducers (CMUTs).

While fingerprint sensors, such as an array of conducting sensors in conjunction with an RF generator, are used to ensure use by authorized individuals, such sensors are vulnerable to being hacked, for example, by artificial (stick on) fingerprints. There is therefore an unmet need for a more secure authorization technique. Moreover, while secure methods exist, they are not sufficiently fast for many consumer applications, where the expectation is for rapid validation of identity.

Systems and method needs to be both secure and rapid to be useful. What is needed is a system and method for secure validation of fingerprints that is both rapid and capable of determining blood flow or monitoring other bio-signs as a sign of life.

SUMMARY OF THE INVENTION

The invention described herein meets at least all of the aforementioned unmet needs. The invention provides a method, apparatus and system for acquiring a sub-surface image or measurement in conjunction with a surface image of tissue at a region and compares the sub-surface image or measurement with a corresponding surface image in order to validate aspects of the measurement or image. One aspect to be validated is that a sub-surface or sub-dermal fingerprint is compatible with the corresponding region of a surface fingerprint. Another aspect to validate is that the sub-surface tissue is alive.

The preferred embodiment of a fingerprint validation system according to the invention comprises: an optical coherence tomography system, generating one or more cross sectional tomographic scans of the fingerprint; the optical coherence tomography system and the surface imaging system are in a preselected physical relationship with respect to each other such that the surface image and the cross sectional tomographic scan are registered; a processor module containing memory, electronic control and processing, surface imaging control and processing; the processor module—by comparing the cross sectional tomographic scans of said fingerprint with the surface image of the fingerprint—validates that the cross sectional tomographic scan is compatible with the corresponding region of the surface image and transmits validation status of the fingerprint. Transmission of validation status typically ensures or denies access to a device or system, such as, for example, an electronic device or other secure device or system.

The preferred embodiment of the inventive method useful in validating a fingerprint comprises the steps of: selecting a relative positioning of an optical coherence tomography system and a surface imaging device, with respect to each other; performing one or more optical coherence tomography depth scans to produce a cross sectional tomographic scan of said fingerprint, said scan including the interface of the epidermis and the dermis; obtaining a surface image of said fingerprint; validating, by comparing said cross sectional tomographic scans of said fingerprint with said surface image of said fingerprint, that said cross sectional tomographic scan is compatible with the corresponding region of said surface image; outputting result of said validation step.

In an alternate embodiment, the method further includes the step of obtaining a plurality of a cross sectional tomographic scans at substantially the same location, thereby enabling in less than one second, a determination of whether or not blood flow is present and thereby a determination of whether or not the finger is alive. In other embodiments OCT scans are processed to monitor for other bio-signs, such as heart rate, respiration rate or the pulsatile behavior of blood flow.

In an alternate embodiment the step of performing optical coherence tomography scan includes using multiple reference optical coherence tomography.

BRIEF DESCRIPTION OF THE DRAWINGS

The drawings provided as an aid to understanding the invention are.

DETAILED DESCRIPTION OF A PREFERRED EMBODIMENT

Terminology

Figure 1:
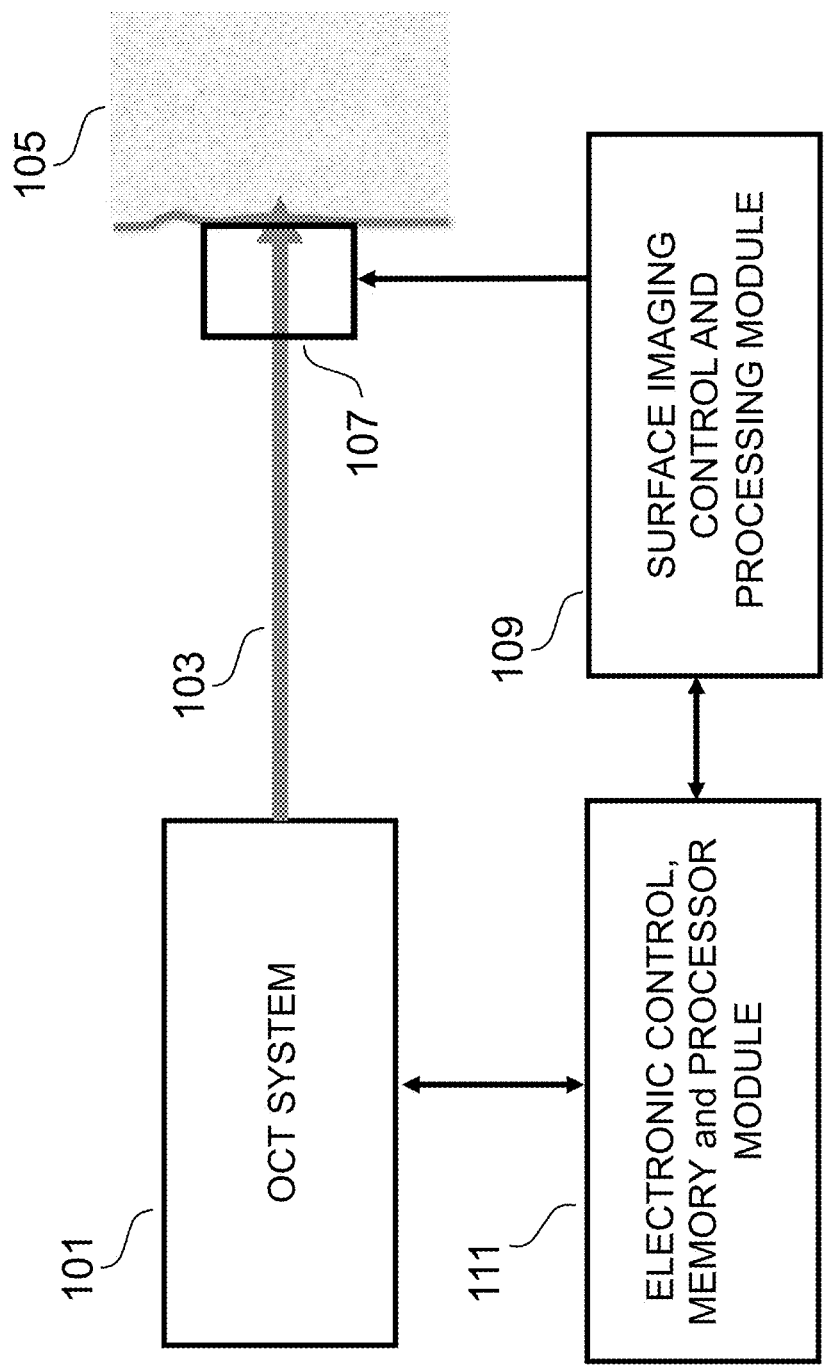
FIG. 1 is an illustration of a system according to the invention.

A selection of terms used in this specification and the intended meanings are set forth hereinbelow as an aid to understanding the invention.

B-scan: a cross sectional tomographic scan obtained using optical coherence tomography; a scan that includes a sub-surface scan.

CCD: Charge Couple Device

CMUT: capacitive micro-machined ultrasonic transducer

Conventional fingerprint: a surface fingerprint; an image of the surface of the skin—the outer epidermis—on a fingertip; any fingerprint image obtained other than by the inventive method and system. Conventional image (and conventional imaging system) includes an image obtained by a camera, a photocopy, or any other common imaging techniques for imaging the surface fingerprint or tissue layer in a two dimensional representation.

OCT: Optical Coherence Tomography

Primary fingerprint: a term used in the field of fingerprint analysis, referring to the region where the epidermis and the dermis meet. Alternately termed "sub-surface fingerprint"; "sub-dermal fingerprint"

Registration: the alignment of the cross sectional tomographic scan with the conventional fingerprint. In a system according to the invention, registration is ensured by the physical arrangement of the optical coherence tomography system and the surface imaging system or device. The position of the OCT is calibrated with respect to the imaging system. Such calibration using, for example, a test pattern, is understood by those of average skill in the relevant art and needs no further elaboration. Calibration includes alignment at multiple surface positions.

Sub-surface: below the surface of the target; below tissue outermost layer; area including tissue beneath the outermost tissue layer; The sub-surface fingerprint, also referred to as a sub-dermal fingerprint or as the primary fingerprint, is located at the interface of the epidermis and the dermis. In an individual's finger, the pattern in outermost layer of the epidermis matches the pattern at the interface of the epidermis and the dermis. Thus, the conventional surface fingerprint is a precise match, or, "copy" of this sub-dermal primary fingerprint.

Validating: determining that the target, typically a fingerprint, matches at the surface and at the interface of the dermis and the epidermis; validating also includes, in an alternate embodiment, determining blood flow, hence ensuring "aliveness". The processor outputs validation status.

Validation status: if positive validation, the output of status enables secure access. If validation fails, output of validation failure is used, for example, to decline device access.

The inventive method useful in fingerprint validation comprises the steps of selecting a relative positioning of an optical coherence tomography system and a surface imaging device, with respect to each other; performing an optical coherence tomography scan to produce a cross sectional tomographic scan of said fingerprint, said scan including the interface of the epidermis and the dermis; obtaining a surface image of said fingerprint; validating said cross sectional tomographic scan using said surface image as a registration of said fingerprint and determining whether said cross sectional tomographic scan is compatible with the corresponding region of said surface image; outputting result of said validation step.

In an alternate embodiment, the method further includes the step of obtaining a plurality of a cross sectional tomographic scans at substantially the same location, thereby enabling in less than one second, a determination of whether or not blood flow is present.

In an alternate embodiment the step of performing optical coherence tomography scan includes using multiple reference optical coherence tomography.

Referring now to the Figures, the preferred embodiment is depicted in FIG. 1 where the target is human tissue, and specifically the region referred to as "fingerprint", and where an OCT system 101 uses an optical beam 102 to non-invasively scan the target 105. A conventional imaging system 107 also captures a surface image of the target 105 which is processed by a surface image control and processing module 109.

An electronic control, memory and processor module 111 processes and stores an OCT scan of the tissue, acquired by the OCT system 101 in conjunction with the conventional surface image of the target. The physical relationship of the OCT system 101 and the conventional imaging system 107 are pre-selected, and is such that the OCT scans are at known or determined locations with respect to the conventional surface image of the target. Because the positions of the imaging system and the OCT probe beam with respect to each other are pre-selected so that the cross sectional tomographic scan is registered with the two dimensional surface image, it is possible to compare (or correlate) the structures shown in the B-scan with the precise corresponding features of the conventional image (i.e. ridges and valleys in the dermis-epidermis interface can be compared with ridges and valleys in the surface fingerprint). The processing module performs the correlations, and outputs validation that the fingerprint is a match or not.

In the preferred embodiment, the surface imaging system 107 is selected from one of the following or an equivalent: a CCD imaging system with an aperture through which the OCT probe beam can be applied to the target; an imaging system that is transparent at the wavelength of the OCT system; an ultra-sonic imaging array such as a capacitive micro-machined ultrasonic transducer (CMUT); an OCT imaging system, which may be the same OCT system that generates the sub-surface scans; a pressure sensitive array, such as is described in U.S. Pat. No. 7,795,062 titled "Method of forming a pressure switch thin film device".

Figure 2:
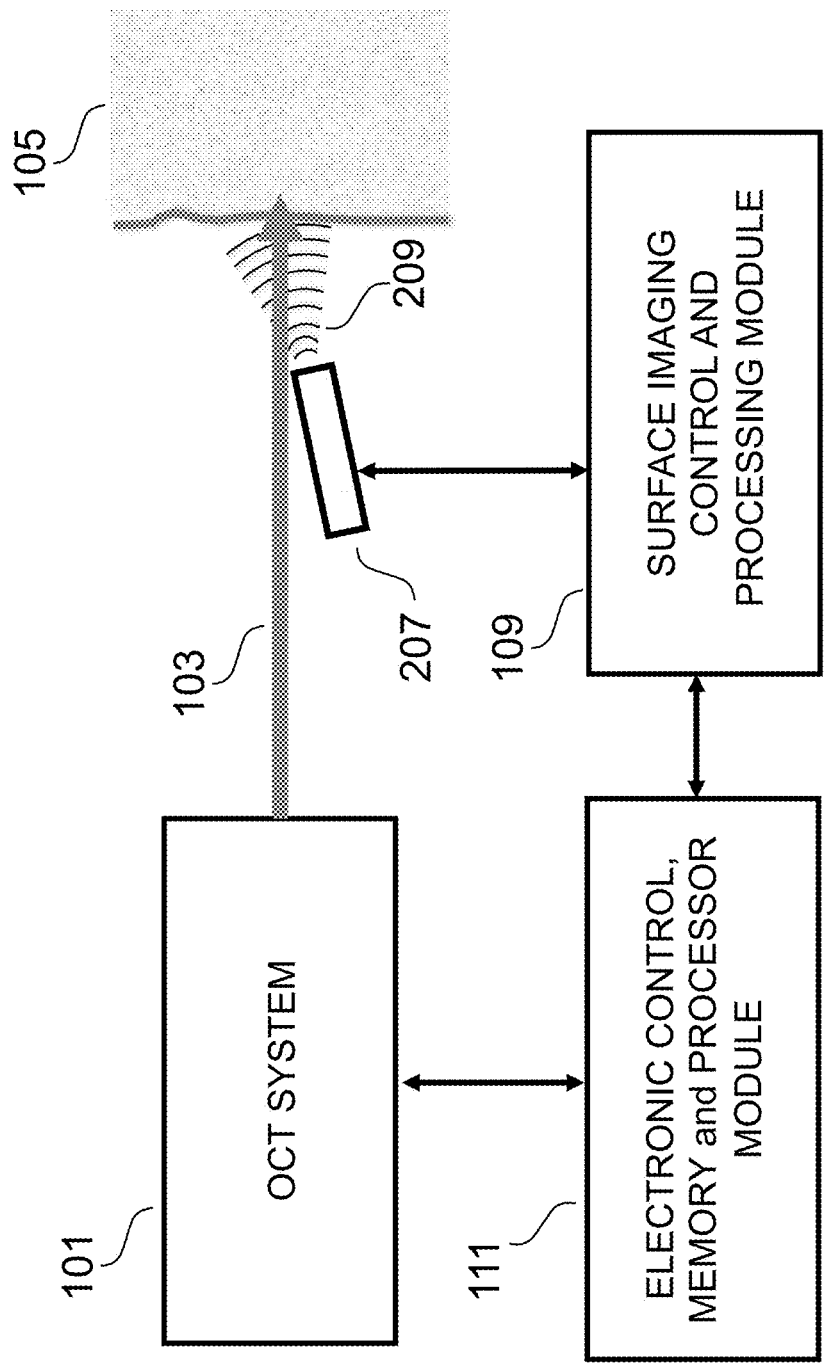
FIG. 2 depicts an alternate embodiment of a system according the invention.

FIG. 2 depicts an alternate embodiment. It is in many respects similar to FIG. 1, however, the surface imaging device 207 is offset from the path of the OCT probe beam. It can be appreciated that such an offset is necessary if the surface imaging device is not transparent. In an alternate embodiment, the surface imaging probe beam 209 is selected from a group of probe beam types, including an RF probe beam or an ultrasound probe beam.

Figure 3:
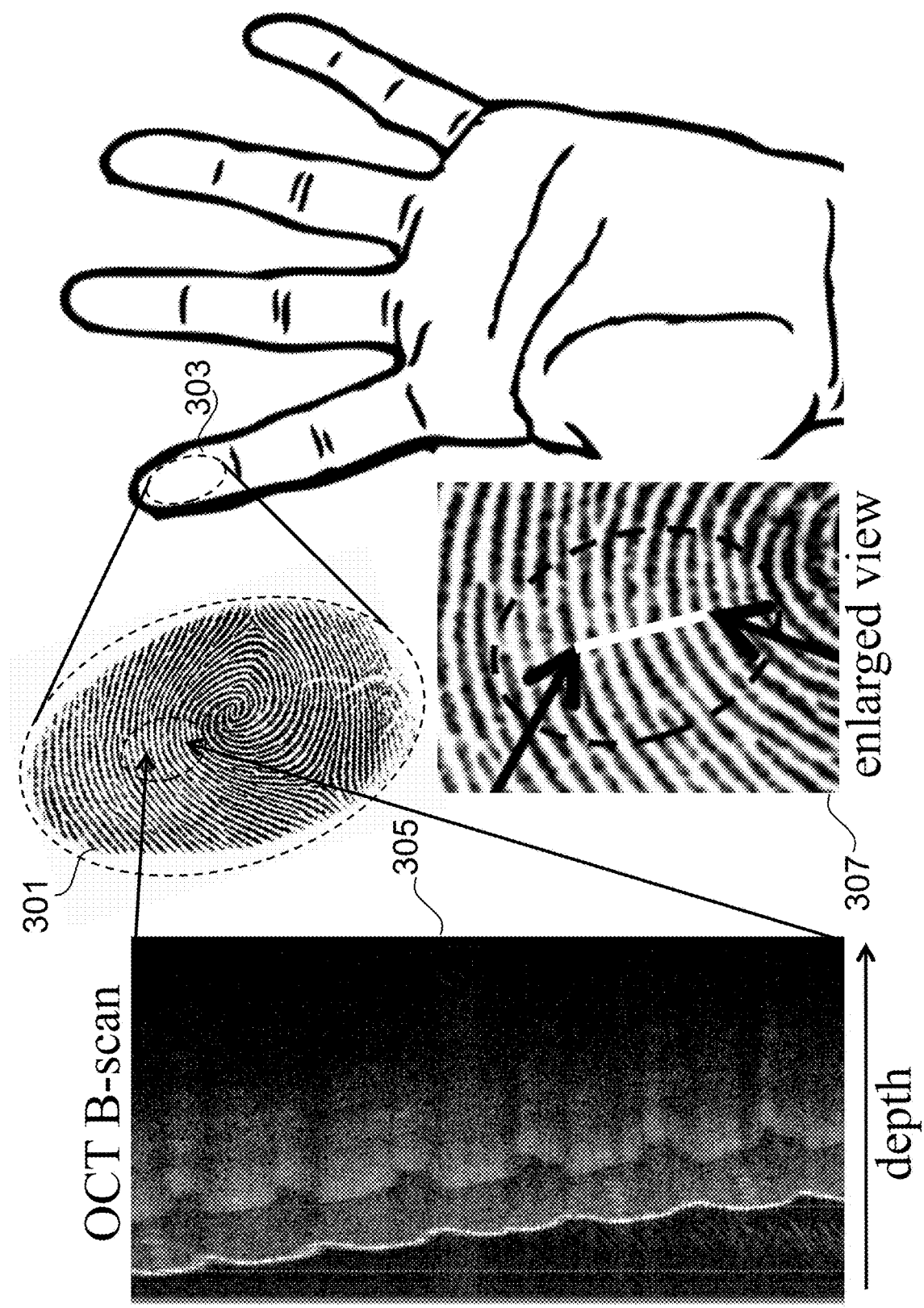
FIG. 3 depicts a cross section tomograph (a B-scan) together with a surface image, illustrating the application of the invention to human fingerprint verification.

FIG. 3 depicts a conventional surface fingerprint 301 of a typical human finger 303 and an OCT B-scan 305 of a region of the finger taken at a known location with respect to the surface image, indicated by the region between the two arrowheads inside the small oval. An enlarged view 307 more clearly depicts the small oval and the arrowheads that define the region of the OCT B-scan 305.

Figure 4:
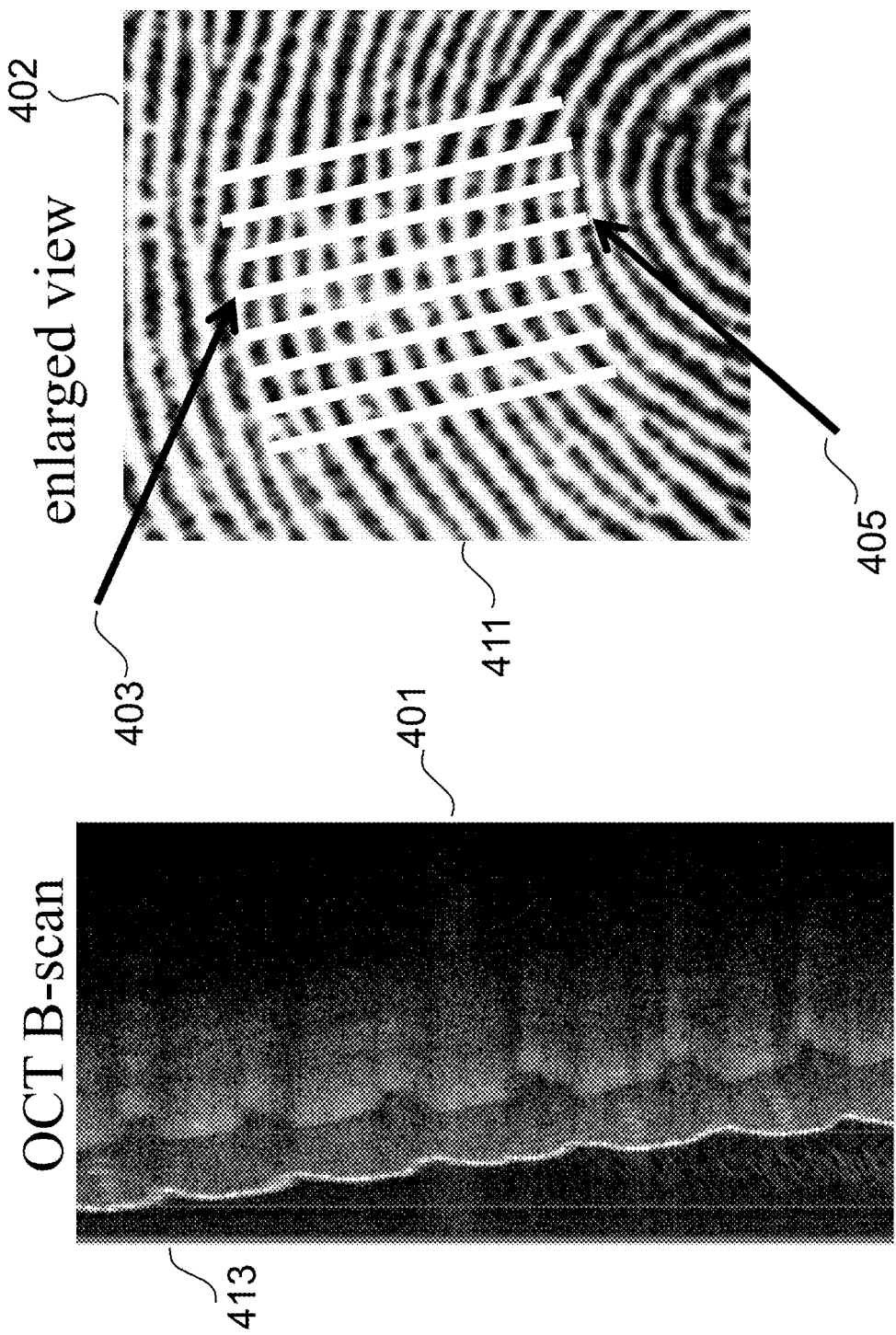
FIG. 4 shows a typical B-scan showing ridges and a surface fingerprint also showing ridges.

In FIG. 4 the OCT B-scan 401 and the enlarged view 402 of the surface image are more clearly depicted. The arrows 403 and 405 indicate the region that corresponds to the cross sectional tomograph commonly referred to as an OCT B-scan 401. The OCT B-scan 401 includes a depiction 407 of the surface fingerprint image and also includes a depiction of a sub-surface version of the fingerprint 409, often referred to as a primary fingerprint. The sub-surface or primary fingerprint is generally understood to be the region where the epidermis and dermis meet.

The electronic control, memory and processor module 111 (of FIGS. 1 and 2) compares the sub-surface fingerprint image 409 with the portion of the B scan showing the surface [OCT image 407] and with the conventional fingerprint image 402 to validate that the sub-surface fingerprint is compatible with the corresponding region of a surface fingerprint.

In the preferred embodiment, validation confirms that that the sub-surface (or primary) fingerprint 409 has contours that correspond to the contours of the surface fingerprint, i.e. that the sub-surface image and the surface image are appropriately compatible. For example the dark line 411 of the enlarged view of the surface image 402 corresponds to the OCT surface detail to the right of 413 and the deeper sub-surface (or primary) image farther to the right of 413 (along the contour of 409). The processing module outputs validation status. Validation status, for example, enables or prevents unlocking of a coupled electronic device such as, for example, a smart phone, a home security system, and other devices where secure access is desired. Note, the surface fingerprint image 402 is a typical example of and image and used herein for illustrative purposes.

While the preferred embodiment describes an OCT B-scan 401 of FIG. 4 taken along a substantially straight line (between the arrow heads of 403 and 405 of FIG. 4) of a corresponding conventional fingerprint imaging device many variations of the invention are possible. The OCT scan need not be a straight line. In an alternate embodiment, the OCT scan consists of an irregular line that is scanned with either a random or a particular relationship to features of the surface fingerprint.

In an alternate embodiment, the OCT performs a lateral scan consisting of a two dimensional scan, such as a raster scan, providing a volumetric image. Such a volumetric image is compared to a surface image taken with a surface imaging device including, but not limited to, a CCD camera, an ultra sound imager, an RF imager, an array of pressure switches. Alternatively such a volumetric image is used to generate the surface image, thus removing the requirement for a separate surface imager.

Figure 5:
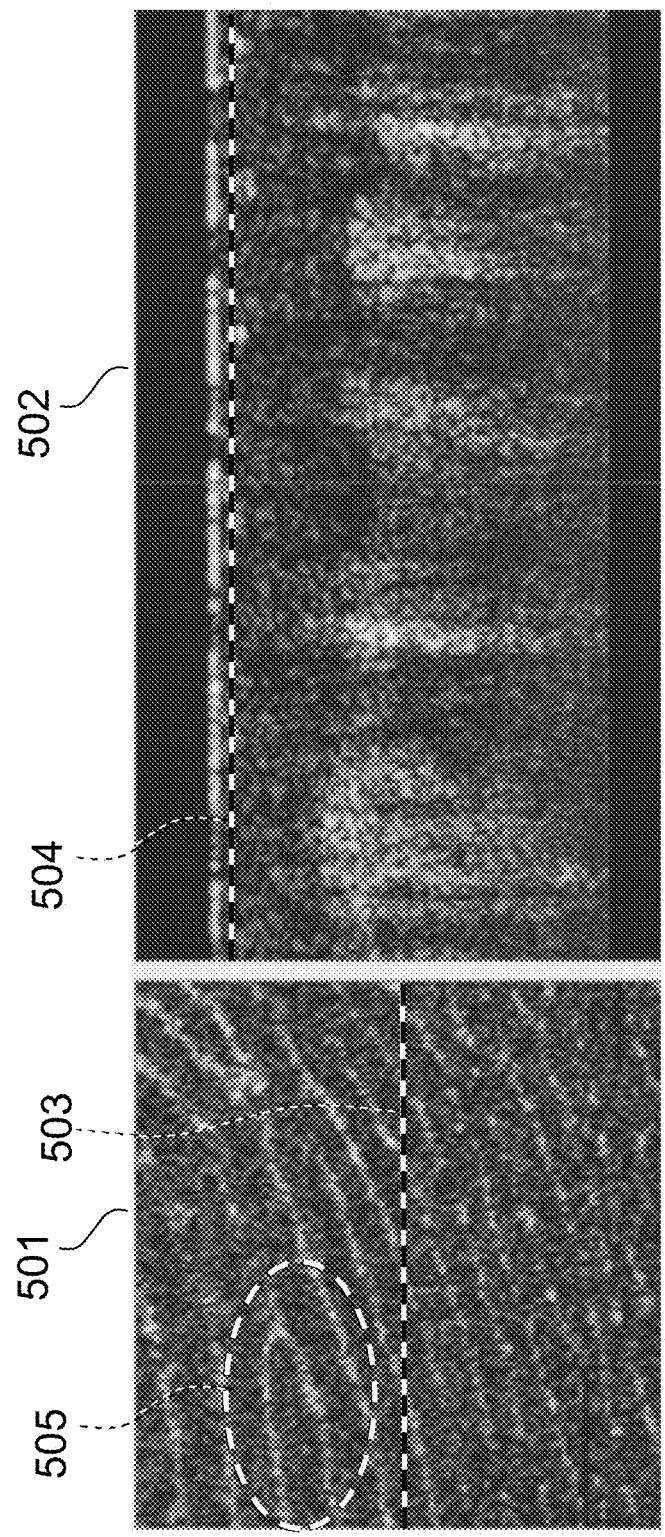
FIG. 5 show a surface fingerprint and the corresponding B scan.

FIG. 5 illustrates a 2D image of a surface fingerprint 501 volumetric data generated by an OCT scanning system. FIG. 5 also depicts an OCT B-scan 502 which is a two dimensional depth image of the region of the 2D tissue image 501 indicated by the dashed line 503. The depicted 2D image of a surface fingerprint 501 is generated from OCT data just below the surface of a glass interface against which the finger was pressed and is indicated in the B-scan 502 as the dashed line 504. The dashed oval 505 surrounds a distinctive feature of the surface fingerprint.

Figure 6:
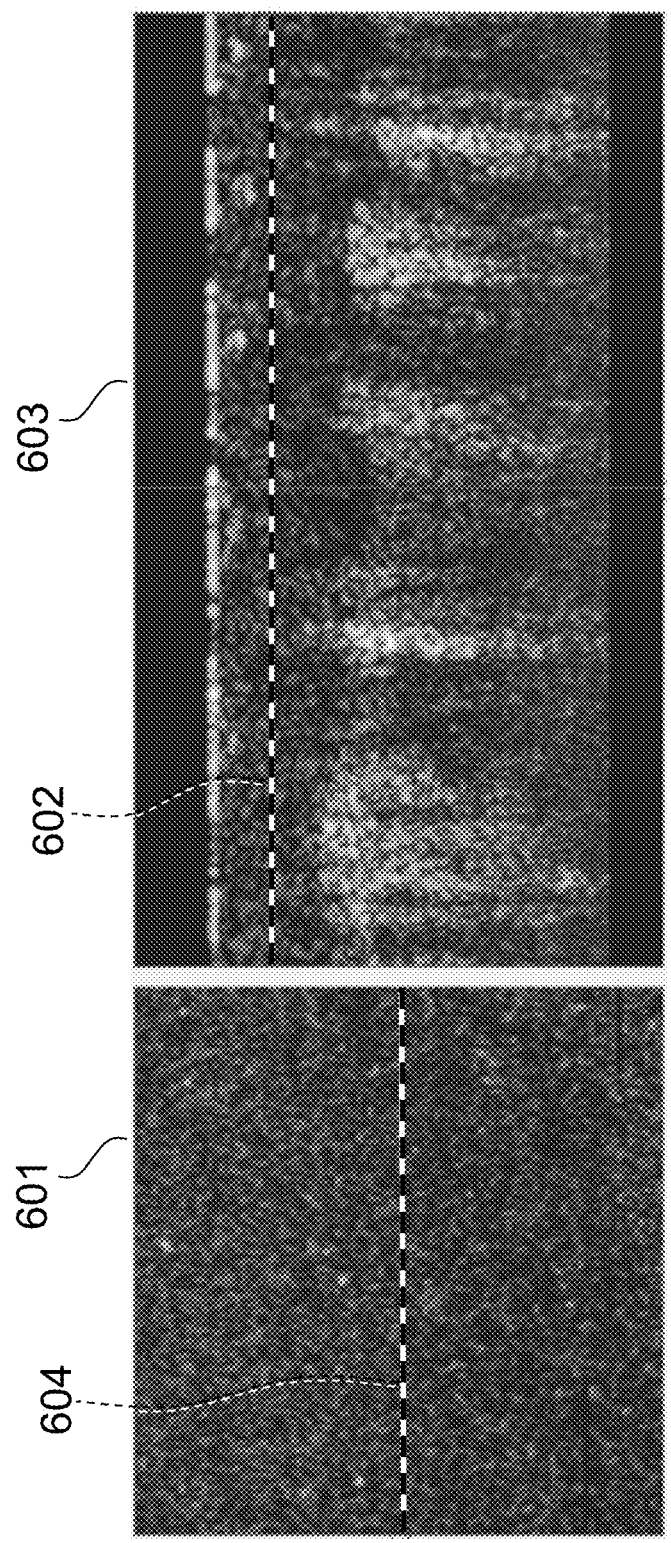
FIG. 6 shows a 2D (two dimensional) image below the surface, and a B scan, illustrating the absence of ridging pattern.

FIG. 6 illustrates a 2D image of a surface region 601 at a depth indicated by the dashed line 602 of the B-scan 603. This surface region 601 is at a depth beneath the surface fingerprint and above the epidermis dermis interface. The B-scan 603 is again located at the region indicated by the dashed line 604 of the 2D image 601. There is no similarity between this 2D image and the surface fingerprint image 501 of FIG. 5.

Figure 7:
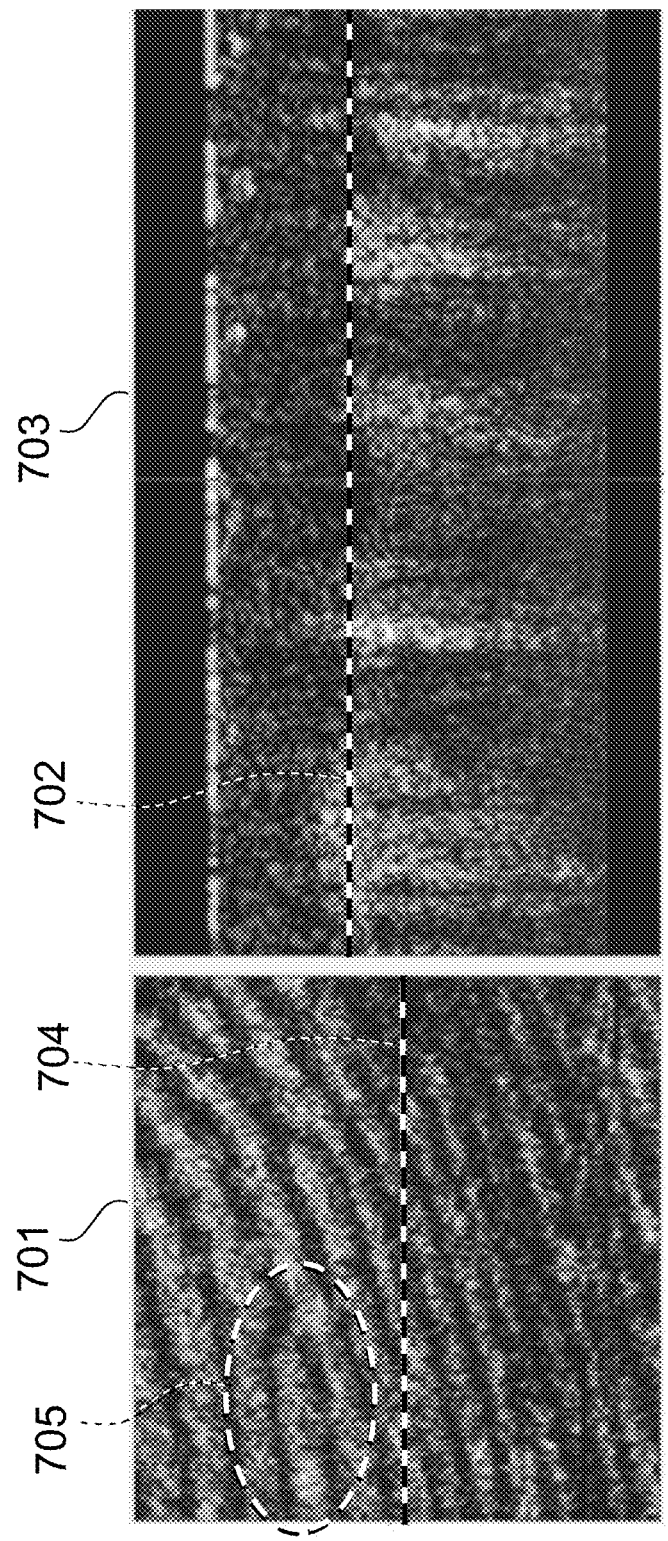
FIG. 7 shows a primary fingerprint, and a B-scan of the region where the epidermis and dermis meet, illustrating the matching ridges.

FIG. 7 illustrates a 2D image of a surface region 701 at a depth indicated by the dashed line 702 of the B-scan 703. This surface region 601 is at a depth in the region of the epidermis dermis interface. The B-scan 703 is again located at the region indicated by the dashed line 704 of the 2D image 701. This primary (sub-surface or sub-dermal) 2D fingerprint image 701 has a high degree of similarity with surface fingerprint image 501 of FIG. 5.

The similarity between the primary or sub-dermal 2D fingerprint image and the surface fingerprint image 501 of FIG. 5 is clearly evident in the regions depicted within the ovals 705 of FIG. 7 and 505 of FIG. 5. This high degree of similarity between the surface and sub-surface fingerprint images of an actual finger enables using conventional image processing techniques to measure the degree of correlation between two such images and to determine whether or not the images (and hence the surface and sub-surface fingerprints) correlate, i.e. to validate that the images are compatible with being different images of the same finger.

In the preferred embodiment aspects of the primary fingerprint at the epidermis dermis interface of one or more B-scans are compared with the corresponding regions od the surface fingerprint. In an alternate embodiment where a large number of adjacent B-scans, constituting a volumetric scan, are available, a 2D sub-surface primary fingerprint can be compared with the 2D surface fingerprint.

The surface and sub-surface fingerprint 2D images of an actual finger can be compared using conventional image processing techniques to measure the degree of correlation between two such images and to determine whether or not the images (and hence the surface and sub-surface fingerprints) correlate. Alternately the images can be processed to analyze for fingerprint minutia (as is well known to those skilled in the art of processing fingerprints) and then the minutia of the two images can be compared.

In an alternate embodiment the OCT system is the only imaging system and in an enrollment process an extensive volumetric scan of the fingerprint is acquired and stored. In subsequent validation a small set of B-scans, such as the eight B-scans depicted by the eight white lines of FIG. 4 is acquired and compared to the stored volumetric scan. If a matching set of corresponding B-scans are found in the stored volumetric scan then the fingerprint is validated.

It can also be appreciated that in another alternate embodiment, a random (or quasi-random) group of point scans are registered by means of the surface fingerprint and compared with extensive previously taken reference OCT data to validate correct tissue layer thickness at particular points. A further alternate embodiment provides an OCT system with multiple optical probe beams to acquire multiple OCT scans simultaneously.

In a system according to the invention, the OCT is selected from the group of any version of either Time Domain-OCT or Fourier Domain OCT systems, including the multiple reference version of Time Domain-OCT (described in some of the references incorporated herein).

In an alternate embodiment, successive OCT B-scans can be taken at substantially the same location and correlated to check for the presence of blood-flow to validate that the tissue being analyzed is alive (and not, for example a fake or non-living finger). The location of other tissue features, such as sweat glands could be monitored as additional identification fiducial markers.

In an alternate embodiment, one or more sweat glands are repeatedly scanned to monitor for changes in the scattering characteristics of such sweat glands. Changes in the scattering characteristics of sweat glands can be processed to determine stress levels of the individual being scanned.

A correlation mapping method using OCT to detect blood flow, and hence aliveness is described in the paper titled "Correlation mapping method for generating microcirculation morphology from optical coherence tomography (OCT) intensity images," by authors Jonathan E, Enfield J, Leahy M J., published in J. Biophotonics, 4(9), 583-587 (2011). This paper is incorporated herein by reference.

While the preferred embodiment is described with respect to a fingerprint, any identifying fiducial, such as a freckle or a skin blemish, could be used to validate a sub-surface image or measurement with a surface image.

Moreover, while the preferred embodiment is described in terms of a security application, the invention could also be used for safety. For example, only when an appropriate surface fingerprint or fiducial is recognized from the surface imager, is the OCT optical probe signal enabled at high power. This could ensure the device could not emit high power when, for example, it could be directed into an individual's eye.

As another safety example, if the device were making a bio-measurement, such as a glucose concentration measurement, that would determine a medical treatment, such as the provision of insulin, then validating that the identity of individual being measured would be a useful safety precaution.

Many variations of the above embodiments are possible. The scope of this invention should be determined with reference to the description and the drawings along with the full scope of equivalents as applied thereto.

I claim:

1. A method of validating a fingerprint, said method comprising the steps of:
    selecting a relative positioning of a multiple reference optical coherence tomography system and a surface imaging device, with respect to each other;
    performing an optical coherence tomography scan to produce a cross sectional tomographic scan of said fingerprint, said scan including the interface of the epidermis and the dermis;
    obtaining a surface image of said fingerprint;
    validating said cross sectional tomographic scan using said surface image as a registration of said fingerprint and determining whether said cross sectional tomographic scan is compatible with the corresponding region of said surface image, and determining blood flow, hence ensuring, in a time period of one second or less, liveness of said target;
    obtaining a plurality of successive OCT B-scans taken at substantially the same location and correlated to check for the presence of blood-flow to validate that the tissue being analyzed is alive;
    outputting result of said validation step, where if positive validation, the output of status enables secure access.

* * * * *